United States Patent

Hamma

[15] 3,656,138
[45] Apr. 11, 1972

[54] INFUSION MONITORING DEVICE
[72] Inventor: John C. Hamma, Milford, Conn.
[73] Assignee: Interscience Corporation, Milford, New Haven, Conn.
[22] Filed: Mar. 18, 1970
[21] Appl. No.: 20,554

[52] U.S. Cl................................340/266, 340/272, 200/85, 177/48
[51] Int. Cl.......................................................G08b 21/00
[58] Field of Search..................340/266, 272, 283; 177/45, 177/48, 173, 116; 200/85; 128/214

[56] References Cited

UNITED STATES PATENTS

| | | | |
|---|---|---|---|
| 1,594,536 | 8/1926 | Ludlow | 177/173 |
| 1,742,229 | 1/1930 | Wood | 340/266 |
| 3,390,238 | 6/1968 | O'Neill | 340/272 |
| 3,425,415 | 2/1969 | Gordon et al. | 340/272 |
| 1,057,313 | 3/1913 | Worliczek | 340/266 |
| 3,105,490 | 10/1963 | Schoenfeld | 200/85 |
| 3,287,721 | 11/1966 | Baehr | 200/85 |
| 3,389,387 | 6/1968 | Hulse et al. | 340/272 |
| 3,169,594 | 2/1965 | Myers | 177/173 |
| 3,481,413 | 12/1969 | Coppola | 177/173 |

Primary Examiner—Donald J. Yusko
Assistant Examiner—Michael Slobasky
Attorney—H. Gibner Lehmann

[57] ABSTRACT

An infusion monitoring device for hospital use, having as its purpose the providing of a signal at the nurse's desk when an infusion (such as an intravenous injection or the like which is being made in a patient's room at a remote location) has progressed to a desired extent. The monitoring device comprises a dial carried by a turnable drum around which there is wound a flexible cable. One end of the cable is attached to a suspension hook on which a bottle containing the supply of infusion liquid is hung. A spring has one end anchored to a casing for the device and has its other end connected with the turnable drum. The drum, dial and spring are contained in the casing, which also carries a settable pointer located in front of the dial. The casing is suspended from the usual type of stand or pedestal commonly utilized for infusion and similar uses. The settable pointer is of metal, and a metal pin extends forwardly from the dial, being engageable with the metal pointer to establish electrical contact thereto. The pointer and the cooperable pin constitute part of an energized control circuit which includes a signal that is activated when contact is established between the pointer and pin. When a bottle of infusion liquid is carried by the suspension of the monitor device, the dial will be rotated in the manner of a weighing scale until equilibrium is established between the weight of the bottle and the force of the extension spring. With the dial at rest, the settable pointer is positioned so as to be a certain distance from its cooperable contact pin on the dial. This distance represents the quantity of the infusion liquid which is to be injected in the patient. As the infusion proceeds, the liquid running out of the bottle will lighten the latter, causing a slow turning of the dial in a direction to cause the contact pin to approach the set pointer. As the pin engages the pointer, the control circuit will be activated, and a signal or indicator thereof, which is located at the nurse's desk, will give an indication that the desired amount of infusion has taken place. The existing nurse's call signal system and circuit may be utilized for the above purpose, whereby these constitute part of the overall control circuit activated by the pointer and dial pin.

9 Claims, 5 Drawing Figures

PATENTED APR 11 1972

INVENTOR.
John C. Hamma
BY H. Gilbert Lehmann
AGENT

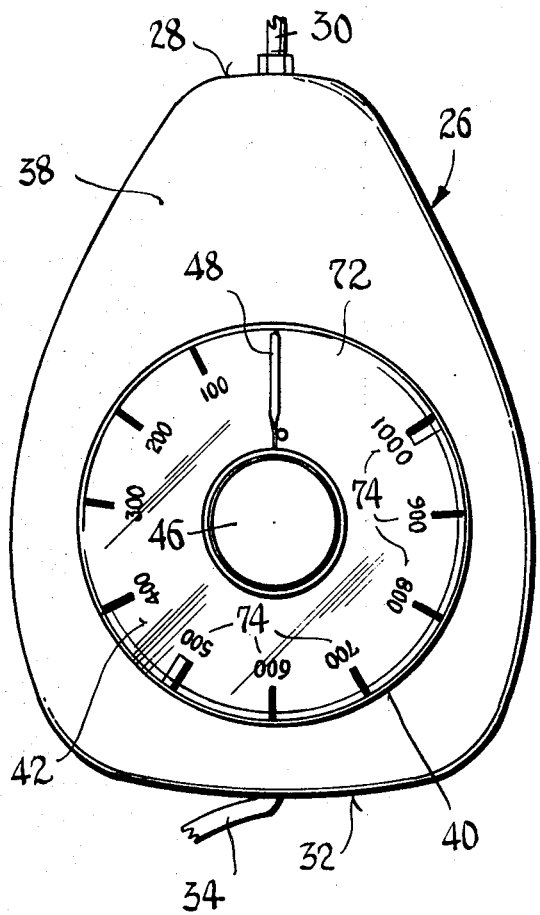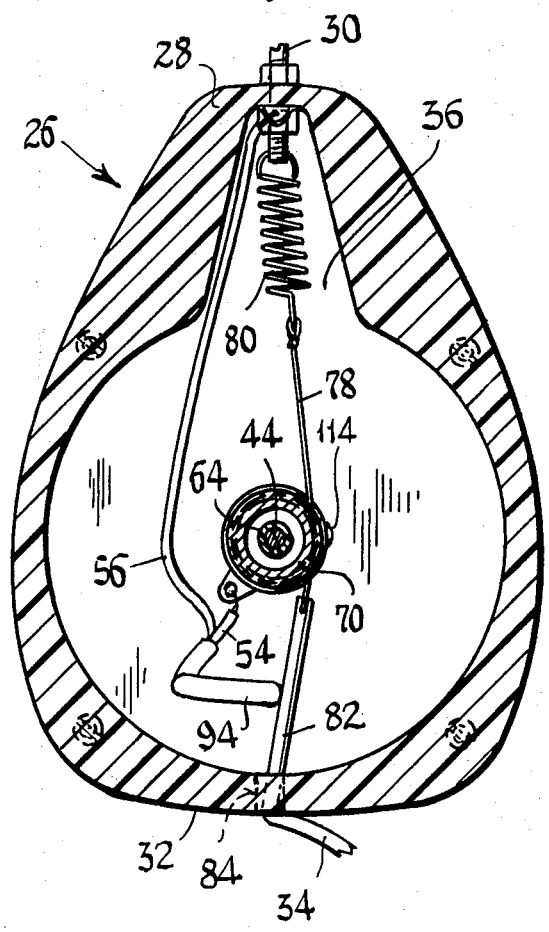

INFUSION MONITORING DEVICE

BACKGROUND

In hospitals each patient's room is equipped with a nurse's call system, this usually comprising a push button switch located at the bedside, and a wall-mounted jack into which the switch is plugged by means of a flexible cable. The wall jack is connected to a signal or annunciator device at the nurse's desk, which is usually in a central location. If the patient desires the services of the nurse, he or she operates the switch button, causing the signal to be activated. If a patient requires special services such as an infusion, intravenous injection or the like to be taken over a period of time, the usual procedure is for the attending nurse to look in on the patient periodically, or to set a timer as a reminder, so as to check on the progress of the infusion. Under any circumstance, the monitoring of the infusion requires watching on the part of the hospital personnel. No accurate procedure or equipment is available to reliably advise the nursing staff or nurse that the infusion has been completed and that the patient now requires attention. This procedure made unnecessary demands on the nurse's time and services, and was in general not a satisfactory situation.

SUMMARY

The above disadvantages and drawbacks of prior procedures involved with the giving of infusions and the like are obviated by the present invention, which has for one object the provision of an improved infusion monitoring device which is especially adaptable for hospital use and is capable of accurately monitoring an infusion and signalling the intended termination of the same at a remote point such as at a centrally-located nurse's desk. A supplemental object of the invention is to provide an improved infusion monitoring device as above set forth, which can utilize the existing nurse's call system or circuit.

These objects are accomplished by a suspension instrument which is hung on a stand or pedestal in the patient's room, and which in turn supports the bottle or container from which the infusion liquid flows. In the casing of the device there is a rotatable drum about which several turns of a cable are wound. The drum is connected to an anchored spring to establish or bias, or to influence the drum. An end portion of the cable extends downward and is attached to a movable hook on which the infusion bottle is supported. The weight of the infusion bottle and contained liquid causes a rotation of the drum to a point where equilibrium is established between the force of the spring on the one hand and the weight of the infusion liquid and bottle on the other hand. The drum carries a dial provided with indicia indicating milliliters of infusion liquid. The casing has a settable pointer disposed in front of the dial; and a metal pin is provided on the dial to be cooperable with the pointer for establishing electrical contact thereto. The pointer and pin constitute part of a control circuit which is plugged into the wall jack of the nurse's call system. After the dial has come to rest in a condition of equilibrium, the pointer is set with respect to the dial to indicate the desired number of milliliters of infusion liquid which the patient is to receive. As the infusion progresses, the lesser weight of the bottle as it empties results in turning of the drum and dial, until a point is reached where the metal pin of the dial engages the pointer. This closes the control circuit and activates the nurse's call system, causing a signal to be given at the nurse's desk, thereby indicating that the infusion is now to be discontinued.

Other objects and features of the invention reside in an improved infusion monitoring device as above set forth, which is especially simple in construction and economical to fabricate; an infusion monitoring device which is small and compact, and may be readily utilized with existing equipment such as the pedestal stands, nurse's calling system, etc. already existing in hospitals; an infusion monitoring device which is simple to operate and set, sensitive in its response, and reliable in use; and an infusion monitoring device which is of sturdy construction, and is not likely to easily get out of order whereby it is capable of an extended period of usefulness.

Still other features and advantages will hereinafter appear.

In the accompanying drawings:

FIG. 4 is a vertical section taken on the line 4—4 of FIG. 3.

FIG. 5 is a front plan view of the monitoring device.

Figure 1:
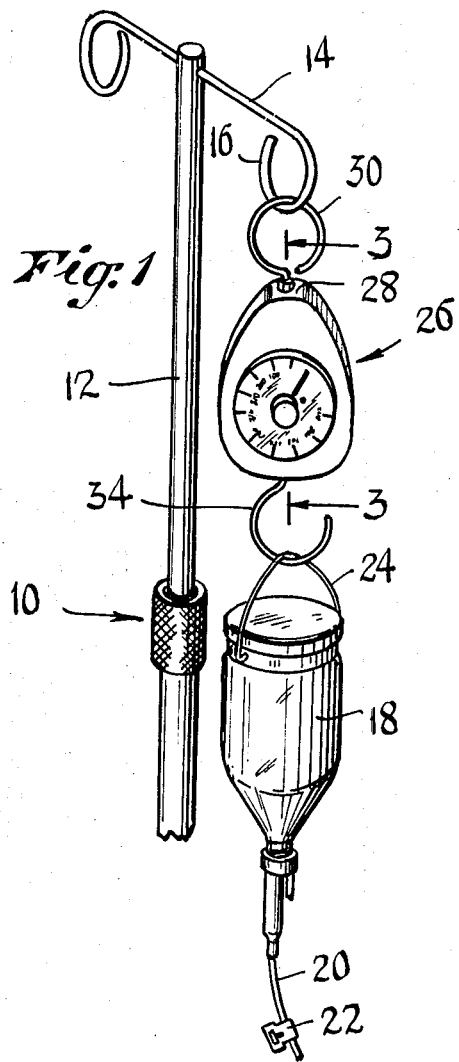
FIG. 1 is a perspective view of the present improved infusion monitoring device being supported on a usual type of hospital pedestal, and in turn supporting a bottle of the kind utilized to hold infusion liquid.

Referring first to FIG. 1 there is illustrated a usual type of hospital pedestal 10 having a vertically adjustable upright post 12 provided at its top with a transverse supporting arm 14 terminating in a large-diameter hook 16. FIG. 1 also shows an inverted infusion bottle 18 having a discharge hose 20 and shut-off valve 22, and having a pivoted loop 24 by which the bottle is normally supported on the hook 16 of the pedestal arm 14.

In accordance with the invention there is provided a novel and improved infusion monitoring device which is interposed between the hook 16 of the pedestal and the loop 24 of the infusion container 18. The said monitoring device comprises a relatively small plastic casing 26 which carries at its top wall 28 a hook or eye-bolt 30 adapted to be engaged by the pedestal hook 16. Extending out through the bottom wall 32 of the casing 26 is a hanger member or hook 34 engaged with the loop 24 of the container 18.

The casing 26 has a rear wall 36 and a front wall 38, the latter being provided with a large central opening or window 40 which is spanned by a transparent convex pane 42. Extending between the pane 42 and the rear wall 36 of the casing is a horizontal metal shaft 44, accommodated in suitable bearing openings in the back wall and window pane. At its front end, the shaft 44 carries a spring 45 behind the pane 42, and an adjusting knob 46 in front of the pane. Also behind the pane 42 the shaft 44 carries a pointer 48, secured to the shaft in any suitable manner.

At its back end the shaft 44 has a shoulder 50 which is engaged with a metal eyelet 52, by which electrical contact is established between the shaft 44 and a lead wire 54 comprising part of the control circuit of the monitor. A second lead wire 56 of the control circuit is connected with an eyelet 58 which is secured under a nut 60 that is threaded on the shank 62 of the hook 30.

On the shaft 44 there is an insulating sleeve 64, on which are carried anti-friction ball bearing assemblages 66 and 68. The bearing assemblages 66, 68 in turn rotatably carry a hollow drum 70 at the front end of which there is mounted a dial 72 having indicia 74 including numbers indicating milliliters of liquid. By such mounting, the drum 70 which is of metal is electrically insulated from the metal shaft 44. The drum 77 has a helical groove 76 on its exterior, midway between the front and rear ends thereof; carried in said groove and making good electrical contact therewith is a metal wire or cable 78 having one end mechanically and electrically connected with a helical, metal extension spring 80 which in turn is secured to the shank 62 of the suspension hook 30. The drum 77 may be silver plated, and the wire or cable 78 may also be silver plated to establish and maintain a low resistance electrical contact. The other end of the metal wire 78 is connected to the shank 82 of the bottom hook 34, said shank being vertically movable in a bearing opening 84 n the bottom wall 32 of the casing 26.

By the above arrangement it will now be understood that a downward force applied to the lower hook 34 will cause rotation of the drum 70 and dial 72 as the wire 78 is pulled downward and around the drum, accompanied by expansion of the extension spring 80. Depending on the force applied to the lower hook 34 a condition of equilibrium can be reached, wherein the force on the hook is exactly counteracted by the force of the spring 80. This is what occurs when a full or partially full container 18 is placed on the lower hook 34. As infusion liquid runs out of the container 18 while it is carried on the hook 34, the lightening of the load on the hook will enable the spring 80 to begin restoring itself, and this will result in a reverse turning of the drum 70 and dial 72. Use is made of this action to cause a signal to be given at a remote point, when a predetermined quantity of liquid has flowed out of the container 18. The drum 70 and dial 72 carry a metal contact pin 84 which is disposed in the path of travel of the settable pointer 48 and is engageable with the latter to establish electrical contact therewith. When this occurs, the circuit through the control wires, 56 will be completed and this will result in a signal being given if the control circuit is connected with the wall jack of the nurse's call system.

For purposes of such connection there is provided an electrical adapter device 86 comprising a tubular casing 88 having at one end with an electrical jack 90 and at the other end an electrical plug 92. The plug 92 and the jack 90 are connected in parallel as shown in FIG. 2, and are also connected with a two-wire cable 94 passing through the side wall of the tubular casing 88, said cable containing the control circuit wires 54, 56.

Figure 2:
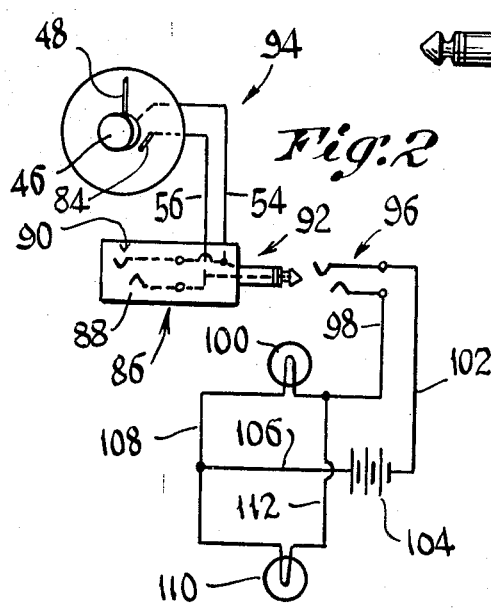
FIG. 2 is a schematic circuit diagram of the infusion monitoring device and a simple nurse's call circuit as commonly found in hospitals.

Referring to FIG. 2, the existing nurse's call system may comprise a wall-mounted jack 96 connected by a wire 98 with a signal light 100 located near the patient's bedside or in the patient's room. The jack 96 is also connected by a wire 102 with a source of energy or battery 104 which in turn is connected by a wire 106 with the other terminal of the indicator lamp 100, through a wire 108. The wire 108 extends through a long cable to a second indicator lamp 110 which may be located at the nurse's desk in the central personnel area. The indicator lamp 110 is connected by a cable wire 112 with the wire 98, thereby completing the circuit of the nurse's call system.

Operation of the monitor device of the present invention can now be readily understood. Considering FIG. 2, the adapter 86 is plugged into the wall jack 96 of the nurse's call system. The nurse suspends the monitor device and casing 26 from the pedestal hook 16, and hangs the full or partially-filled container 18 on the lower hook 34 of the monitor device. This will cause rotation of the dial 72 to a position which is a function of the weight of the container 18 and the liquid contents therein. The nurse then sets the pointer 48, by means of the knob 46, to indicate the desired number of milliliters which is to constitute the infusion. For example, considering FIG. 5, if the dial 74 has come to rest in the position illustrated the nurse may set the pointer 48 to the graduation 200, if 200 milliliters are to be injected. Or, the nurse may set the pointer 48 to any other graduation, representing the desired quantity of the infusion. Thereafter, the monitor will take over the job of indicating when the infusion is to be discontinued. As the liquid flows out of the container 18, the dial 72 will slowly rotate in a counterclockwise direction as viewed in FIG. 5 until the metal contact pin 84 thereof comes into engagement with the metal pointer 48. This will close the circuit through the control wires 54, 56, and will cause energization of the signal lamps 100 and 110, the latter lamp being located at the central nurse's area or nurse's desk. This will apprise the nurse of the fact that the infusion is now to be discontinued.

The electrical adapter 86 having the jack 90 makes it possible for the regular nurse's call system to be utilized even though an infusion is being monitored. The plug of the patient's push button cord is merely plugged into the jack 90 whereby the push button is in parallel with the control circuit of the monitor. When the patient operates the push button, it will cause the signal lamps 100, 110 to be energized, indicating that the services of the nurse are desired.

Figure 3:
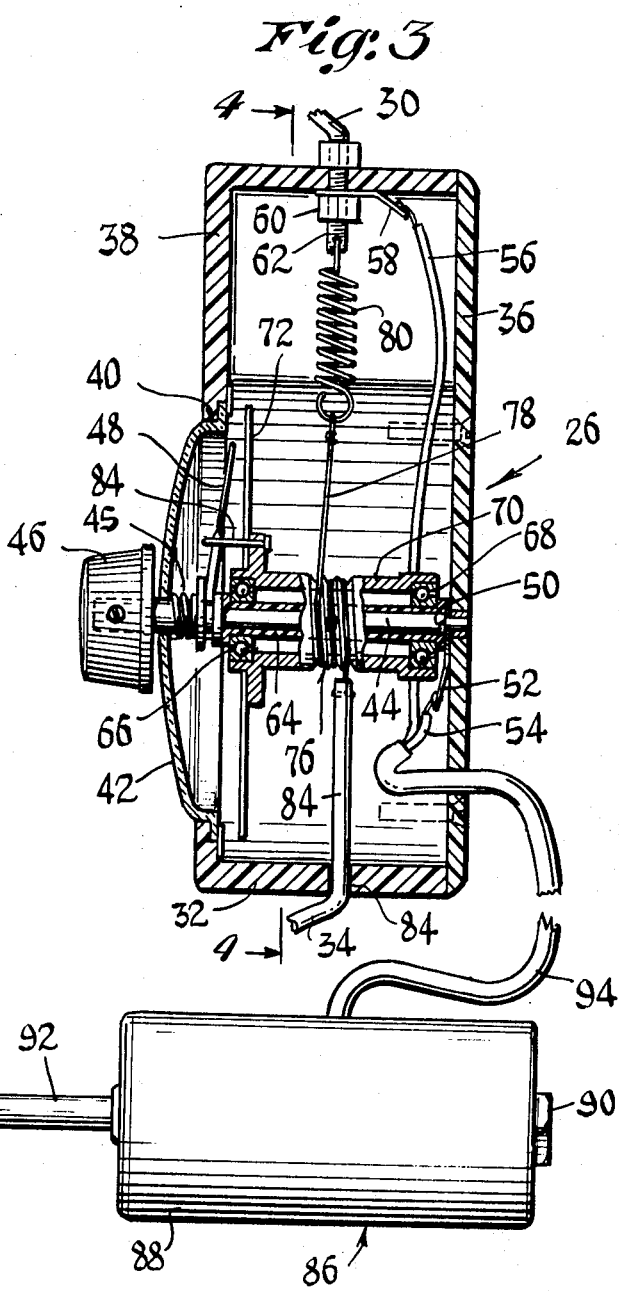
FIG. 3 is a vertical section view through the infusion monitoring device, taken on the line 3—3 of FIG. 1. Also shown is a control cable and an electrical adapter enabling the monitor to be plugged into the existing wall jack of the nurse's call system.

As seen in FIGS. 3 and 4, the wire or cable 78 may be attached to the drum 70, as by a pin 114, the cable 78 being soldered to the pin and to the drum as shown.

It will now be understood from the foregoing that I have provided a novel and improved, especially simple and effective infusion monitoring device which may be easily and quickly installed at the patient's bedside when it is necessary for the patient to have an infusion. The monitor device is small, compact and light in weight, and is easily accommodated by the existing equipment of the hospital. It is usable without change, with different sizes and shapes of infusion bottles. Relatively few parts are involved, and the setting and operation of the device are seen to be simple and foolproof. The device will provide a sensitive and accurate indication when the desired amount of the infusion liquid has been exhausted from the container 18.

Variations and modifications are possible without departing from the spirit of the invention.

I claim:

1. A device for monitoring liquid infusions comprising, in combination:
   a. a casing having a viewing window,
   b. a drum turnably mounted in the casing for rotation about a horizontal axis,
   c. a dial having indicia on its face, mounted so as to be visible through the viewing window,
   d. a pointer disposed in front of the dial,
   e. said dial being carried by said drum,
   f. a horizontal shaft coaxial with the drum,
   g. said pointer being carried by the horizontal shaft, and being settable to different rotative adjusted positions,
   h. manually engageable means disposed at the front of the viewing window and comprising a knob carried by the shaft, for turnably adjusting the pointer and shaft,
   i. a flexible cable wrapped around said drum and extending downward therefrom in a substantially vertical direction, said cable drivingly engaging the drum,
   j. a spring having one end connected to the casing and having its other end connected with the drum to influence the same,
   k. a hanger located outside of the casing and connected to the downwardly extending end of the flexible cable,
   l. a pair of cooperable contacts respectively connected to said pointer and dial, said contacts being engageable and disengageable respectively in response to opposite relative movements of said parts, and
   m. a control circuit comprising said spring and cable, connected with said cooperable contacts.

2. The invention as defined in claim 1, and further including:
   a. an electrical adapter having a plug and a jack connected in parallel and connected with said control circuit.

3. The invention as defined in claim 2, and further including:
   a. a monitor circuit having two remotely-located indicators and a source of energy for energizing the same,
   b. said monitor circuit having a jack disposed adjacent one of said indicators, for receiving the plug of the electrical adapter,
   c. said control circuit comprising an extension line extending between the casing and the electrical adapter.

4. The invention as defined in claim 3, and further including:
   a. a nurse's call circuit having a push button switch and plug,
   b. said plug being insertable in the jack of the electrical adapter.

5. The invention as defined in claim 1, wherein:
   a. said hanger passes through the center portion of the bottom wall of the casing, and is movable guided therein, and
   b. a suspension member attached to the center portion of the top wall of the casing for hanging the latter from a support, c. the axis of the drum being contained in a vertical plane which passes through said center portions of the casing.

6. The invention as defined in claim 1, and further including:
   a. a transparent pane spanning said window at the front of the casing and having a center opening through which the shaft passes, and
   c. said cooperable contacts comprising said pointer and a pin eccentrically disposed on the dial to the rear of said pane and engageable with said pointer.

7. The invention as in claim 6, wherein:
   a. said control circuit comprises a wire lead passing through the rear lower portion of the casing,
   b. the spring, cable wire lead and drum are of metal and constitute a continuous circuit,
   c. one of said cooperable contacts comprising an eccentric pin carried by the dial and electrically connected with the drum,
   d. said control circuit being electrically connected to said spring.

8. The invention as in claim 1, wherein:
   a. the spring, cable and drum are of metal and constitute a continuous circuit,
   b. one of said cooperable contacts comprising an eccentric pin carried by the dial and electrically connected with the drum,
   c. said control circuit being electrically connected to said spring.

9. The invention as in claim 1, and further including an adapter comprising:
   a. a tubular housing,
   b. an electrical plug and jack coaxially disposed and electrically connected in parallel,
   c. said control circuit comprising a cable passing through the side of the tubular housing and being constituted of two wires connected to the circuit of the plug and jack.

* * * * *